United States Patent
Cheatham, III et al.

(10) Patent No.: US 9,261,218 B2
(45) Date of Patent: Feb. 16, 2016

(54) PIPELINE LEAK SEALING SYSTEM AND METHOD

(71) Applicant: Elwha LLC, Bellevue, WA (US)

(72) Inventors: Jesse R. Cheatham, III, Seattle, WA (US); William David Duncan, Kirkland, WA (US); William Gates, Redmond, WA (US); Roderick A. Hyde, Redmond, WA (US); Muriel Y. Ishikawa, Livermore, CA (US); Jordin T. Kare, Seattle, WA (US); Nathan P. Myhrvold, Bellevue, WA (US); Tony S. Pan, Cambridge, MA (US); Robert C. Petroski, Seattle, WA (US); Clarence T. Tegreene, Mercer Island, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 260 days.

(21) Appl. No.: 13/955,929

(22) Filed: Jul. 31, 2013

(65) Prior Publication Data

US 2015/0034198 A1    Feb. 5, 2015

(51) Int. Cl.
*F16L 55/16* (2006.01)
*F16L 55/1645* (2006.01)
*F16L 55/165* (2006.01)
*F16L 55/163* (2006.01)

(52) U.S. Cl.
CPC ........... *F16L 55/1645* (2013.01); *F16L 55/163* (2013.01); *F16L 55/1654* (2013.01)

(58) Field of Classification Search
CPC . F16L 55/134; E21B 33/1208; E21B 33/1243
USPC ............................ 138/93, 94, 97, 98; 166/285
See application file for complete search history.

(56) References Cited

U.S. PATENT DOCUMENTS

| | | | |
|---|---|---|---|
| 3,103,235 A * | 9/1963 | Stringham, III | ................ 138/97 |
| 3,298,399 A | 1/1967 | Slade | |
| 3,827,282 A | 8/1974 | Brister | |
| 3,908,682 A | 9/1975 | Thompson | |
| 4,026,329 A | 5/1977 | Thompson | |
| 4,314,577 A | 2/1982 | Brister | |
| 4,385,582 A | 5/1983 | Fuerst | |
| 4,415,390 A | 11/1983 | Smith | |
| 4,429,720 A * | 2/1984 | Beck et al. | ...................... 138/97 |
| 5,778,919 A | 7/1998 | Petrone | |
| 5,833,001 A * | 11/1998 | Song et al. | .................... 166/287 |
| 6,263,896 B1 | 7/2001 | Williams | |
| 6,543,486 B1 | 4/2003 | Morris | |
| 6,899,138 B2 * | 5/2005 | Lundman | ........................ 138/93 |
| 6,966,373 B2 | 11/2005 | Von Gynz-Rekowski | |
| 7,296,597 B1 | 11/2007 | Freyer et al. | |
| 7,452,161 B2 | 11/2008 | Freyer et al. | |

(Continued)

OTHER PUBLICATIONS

PCT International Search Report; International App. No. PCT/US2014/048035; Nov. 27, 2014; pp. 1-3.

*Primary Examiner* — Patrick F Brinson
(74) *Attorney, Agent, or Firm* — Foley & Lardner LLP

(57) ABSTRACT

A method for sealing a leak in a pipeline used to transport fluid includes positioning a sealing device within the pipeline, moving the sealing device through the pipeline to a leak location, and internally generating an inflation pressure to inflate the sealing device to substantially cover a leak opening and limit release of the fluid from the pipeline.

36 Claims, 6 Drawing Sheets

(56) References Cited

U.S. PATENT DOCUMENTS

| | | |
|---|---|---|
| 7,500,834 B2 | 3/2009 | Durward |
| 7,513,274 B1 | 4/2009 | Glenn |
| 8,061,389 B2 | 11/2011 | McEwan |
| 2005/0279417 A1 | 12/2005 | Bednarzik |
| 2006/0278281 A1 | 12/2006 | Gynz-Rekowski et al. |
| 2007/0284011 A1 | 12/2007 | Freyer et al. |
| 2012/0067447 A1 | 3/2012 | Ryan |
| 2012/0080114 A1 | 4/2012 | McEwan |

* cited by examiner

PIPELINE LEAK SEALING SYSTEM AND METHOD

BACKGROUND

Pipelines are used to transport fuels and other fluid goods between one or more locations. For instance, pipeline transport is often the most economical way to transport large quantities of oil or natural gas over land. A pipeline for transporting fluid goods is constructed to resist ruptures or leaks within the pipeline. However, the pipeline may develop a leak or rupture through which the fluid goods may escape, resulting in a loss of goods and potentially causing further damage to the pipeline if the rupture or leak is not patched or sealed within a reasonable time.

A fluid pipeline may include block valves or block valve stations positioned at intervals (e.g., every 20 to 30 miles) along the pipeline. When a leak is identified within the pipeline, these block valves may be closed to isolate the leak to a particular segment between two block valves. However, the fluid goods within this particular segment, which may be a stretch of pipeline over a long distance, may be lost through the leak before the leak can be patched or sealed. Also, the closed block valves may prevent fluid from being transported through the pipeline until the leak is sealed, perhaps blocking the supply of the fluid goods to one or more locations for a prolonged period of time.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

An embodiment of the present disclosure relates to a method for sealing a leak in a pipeline used to transport fluid. The method includes positioning a sealing device within the pipeline, moving the sealing device through the pipeline to a leak location, and internally generating an inflation pressure to inflate the sealing device to substantially cover a leak opening and limit release of the fluid from the pipeline.

Another embodiment of the present disclosure relates to a sealing device for sealing a leak within a pipeline for transporting fluid. The sealing device includes a frame, and an inflatable bag coupled to the frame and sized according to one or more dimensions of the pipeline. The frame and the inflatable bag are configured to move through the pipeline. The inflatable bag comprises a gas generator and is configured to at least partially seal the leak and to inhibit release of the fluid from the pipeline when the inflatable bag is inflated.

Another embodiment of the present disclosure relates to a sealing device for sealing a leak within a pipeline for transporting fluid. The sealing device includes a closed flexible wall formed into a substantially tubular shape defining an opening, and an internal frame coupled to the closed flexible wall and configured to control a movement of the closed flexible wall by applying a force to the closed flexible wall. The movement of the closed flexible wall moves the sealing device through the pipeline, and the sealing device may be deployed in order to seal the leak.

Another embodiment of the present disclosure relates to a system for sealing a leak within a pipeline for transporting fluid. The system includes a sealing device, which includes a flexible wall formed into a substantially tubular shape defining an opening, and an internal frame coupled to the flexible wall and configured to control a movement of the flexible wall by applying a force to the flexible wall. The movement of the flexible wall moves the sealing device through the pipeline, and the sealing device may be deployed in order to seal the leak. The system also includes a sensor assembly configured to monitor a pipeline condition, and a control module configured to receive a signal from the sensor assembly, and to control the force applied by the internal frame.

DETAILED DESCRIPTION

Figure 1:
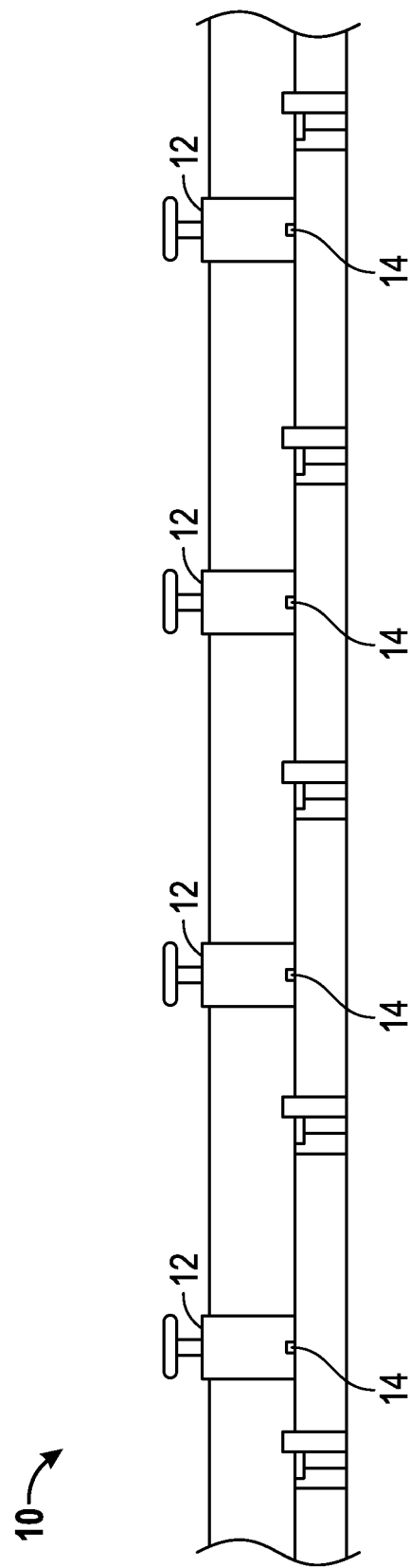
FIG. 1 is a side view of a fluid pipeline according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, a leak sealing system is shown for sealing a leak within a fluid pipeline. The leak sealing system includes a sealing device configured to move to a leak location within the pipeline, deploying or inflating to seal a leak within the pipeline. The sealing device is sized and shaped such that fluid is able to flow past or through the sealing device when the sealing device is inflated, maintaining the transportation of fluid through the pipeline. The leak sealing system also includes a sensor assembly configured to monitor conditions of the pipeline in order to determine the location of the leak and the location of the sealing device as it moves through the pipeline. The sealing device may be sized and shaped to fit the pipeline in order to provide a fluid seal, inhibiting the release of fluid from the leak until the leak can be more permanently patched or repaired.

Referring to FIG. 1, pipeline 10 for transporting goods is shown according to one embodiment. In this embodiment, pipeline 10 is elevated above the ground, but pipeline 10 may otherwise be positioned below or within the ground, or in any other arrangement as may be suitable for the particular application of pipeline 10. In some embodiments, pipeline 10 is used to transport fluid (e.g., gas, liquid, etc.) between two points. For instance, pipeline 10 may be used to transport fuel, such as natural gas, between two or more sites (e.g., fuel refinery, fuel storage area, fueling station, etc.) as part of a fuel transportation system. In other embodiments, pipeline 10 may be used to transport sewage, slurry, water, or any other fluid.

In the embodiment of FIG. 1, pipeline 10 includes block valves 12 positioned at intervals along pipeline 10. The distance between block valves 12 may vary depending upon the length of pipeline 10 and other engineering considerations, but in various other embodiments the distance may range from a few meters to many kilometers. Block valves 12 are configured to selectively block fluid flow in one or both directions in order to isolate a segment of pipeline 10 for maintenance or repair. In the event of a leak within a particular section or segment of pipeline 10, block valves 12 may be closed (e.g., actuated) to block the flow of fluid through the particular section or segment of pipeline 10 containing the leak. When block valves 12 are closed, the flow of fluid through pipeline 10 is halted, perhaps shorting or reducing a fuel supply to one or more fuel sites until the leak can be fixed or patched. The fluid within the particular segment having the leak (i.e., between block valves 12 surrounding the leak) may exit pipeline 10 through the leak.

In an exemplary embodiment, block valves 12 (e.g., block valve stations) include flow sensors 14 (i.e., fluid sensors, fluid flow sensors, flow velocity sensors, etc.) configured to monitor the flow of fluid through pipeline 10. Flow sensors 14 may be configured to monitor a flow velocity of the fluid at a specific location within pipeline 10 (e.g., at block valve 12, etc.), a volumetric flow rate of the fluid at a specific point or location within pipeline 10, and/or another measure of fluid flow suitable for the particular application of flow sensors 14 and/or the leak sealing system. In one embodiment, flow sensors 14 are included as part of sensor assembly 26, which is described in further detail below and shown in FIG. 2.

Flow sensors 14 may be used to detect and/or locate a leak within pipeline 10 by detecting a reduced fluid flow (e.g., flow velocity, volumetric flow rate, etc.) at a particular location, which may indicate a loss of fluid through a leak in pipeline 10. In one embodiment, flow sensors 14 are configured to determine the location of the leak (i.e., the leak location) based on the fluid flow within pipeline 10. In this embodiment, flow sensors 14 are configured to send one or more signals representing the leak location to control module 50 (shown in FIG. 2). In another embodiment, flow sensors 14 are configured to send one or more signals representing the fluid flow within pipeline 10 to control module 50 (e.g., controller), and control module 50 is configured (e.g., programmed) to determine the leak location based on the signals received from flow sensors 14.

While flow sensors 14 are positioned at block valves 12 in the illustrated embodiment of FIG. 1, flow sensors 14 may be otherwise positioned within pipeline 10 in other embodiments. For instance, flow sensors 14 may be positioned on interior wall 16 (shown in FIG. 2) of pipeline 10, coupled to sealing device 20 (shown in FIG. 2) or sealing device 60 (shown in FIGS. 5 and 6) as part of sensor assembly 26, or positioned in another location suitable for monitoring a fluid flow within pipeline 10. Pipeline 10 may include a plurality of flow sensors 14 as may be suitable for the particular application of flow sensors 14 and/or the leak sealing system, and flow sensors 14 may be positioned at more frequent intervals along pipeline 10 than the frequency of block valves 12 (i.e., there may be less distance between each flow sensor 14 within pipeline 10 than the distance between each block valve 12 along pipeline 10).

Figure 2:
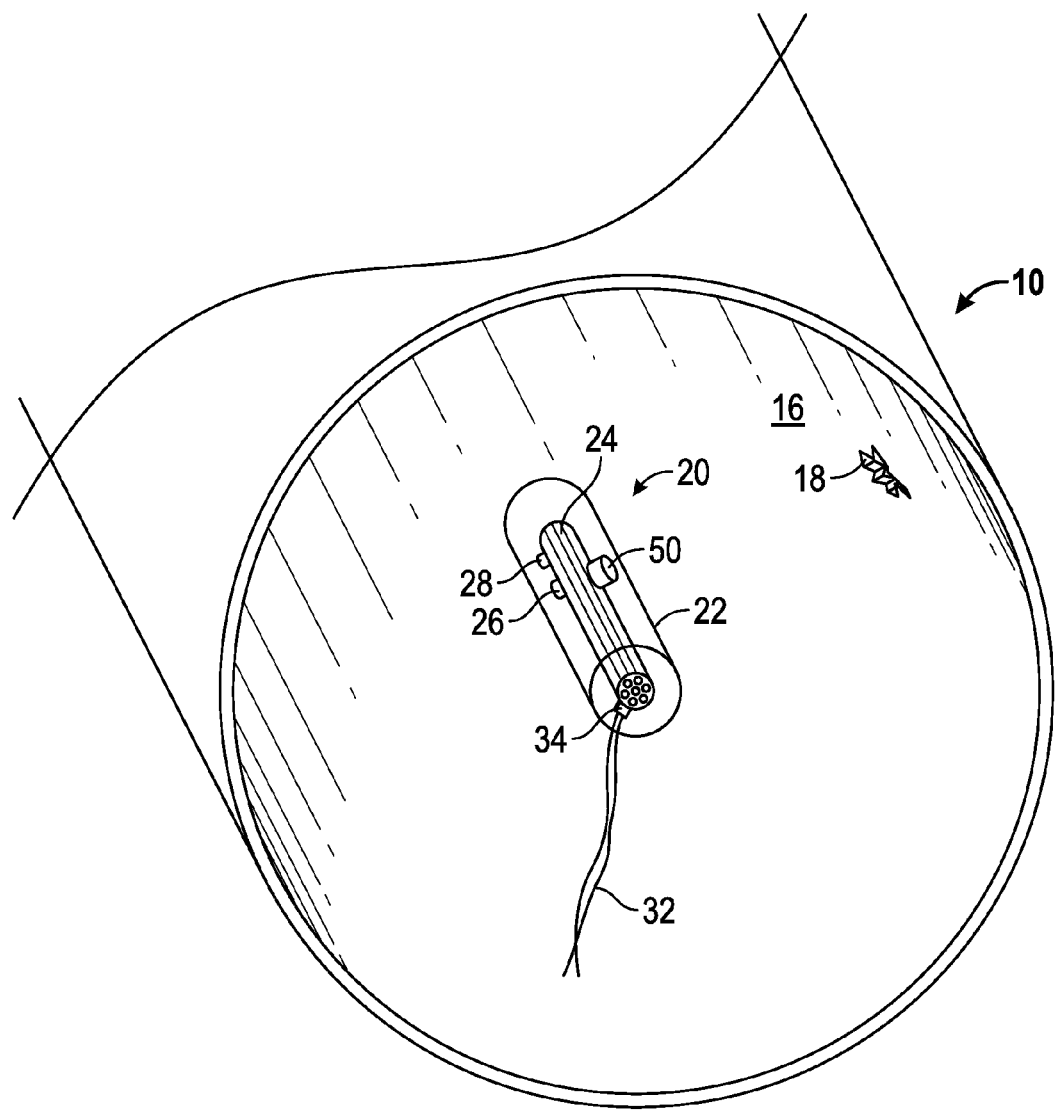
FIG. 2 is a perspective view of a sealing device for the leak sealing system in an uninflated state within the fluid pipeline according to one embodiment.
Figure 3:
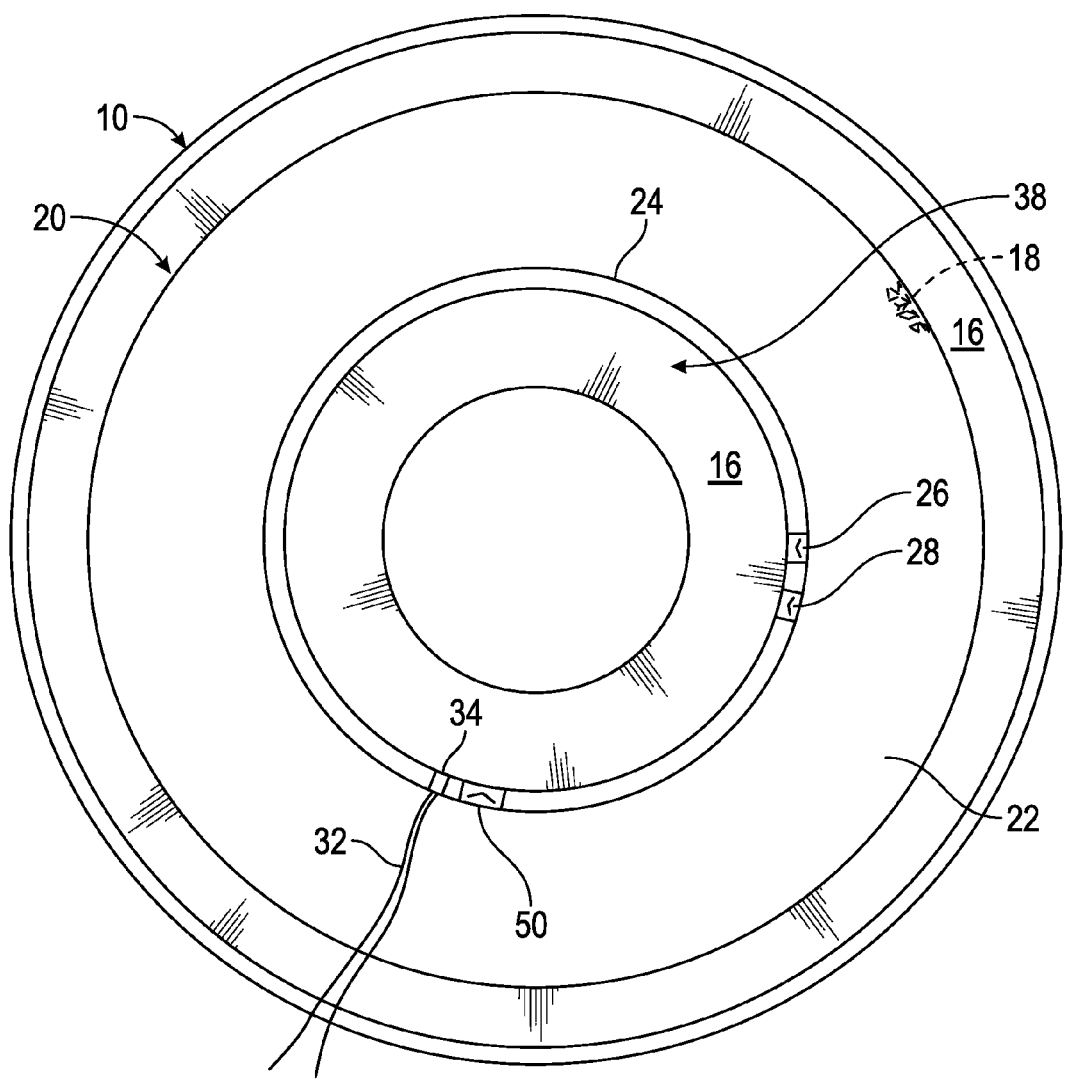
FIG. 3 is a perspective view of the sealing device of FIG. 2 in an inflated state within the fluid pipeline according to one embodiment.

Referring now to FIGS. 2 and 3, sealing device 20 is shown within pipeline 10 according to one embodiment. In this embodiment, sealing device 20 (e.g., inflatable device, airbag device, airbag, etc.) is configured to move through pipeline 10 in an uninflated state (i.e., uninflated or non-inflated configuration or arrangement) (as shown in FIG. 2), inflating to an inflated state to seal a leak such as leak 18 (i.e., leak opening) on interior wall 16 of pipeline 10 (as shown in FIG. 3). In other embodiments, sealing device 20 may be otherwise deployed in order to substantially cover a leak and limit the release of fluid from pipeline 10. Sealing device 20 and the leak sealing system may be used for natural gas pipelines, or for pipelines carrying other fluids, such as water, oil, or any other fluid transported through a pipeline. In one embodiment, sealing device 20 is configured to move along with the fluid flow through pipeline 10, being pushed or guided by the force of the fluid through pipeline 10. In other embodiments, sealing device 20 is moved or guided through pipeline 10 by one or more external forces. For instance, sealing device 20 may be configured such that one or more components of sealing device 20 are subject to remote control. In this embodiment, an operator or technician may be able to remotely control one or more components of sealing device 20 in order to guide sealing device 20 through pipeline 10. For instance, in one embodiment, sealing device 20 includes a guide (e.g., rudder, fin, flag, etc.) (not shown) configured to steer or move sealing device 20 through pipeline 10. In this embodiment, the guide may be remotely controlled by an operator to move sealing device 20 through pipeline 10, or the guide may be pushed or forced by the flow of fluid within pipeline 10 to move sealing device 20 through pipeline 10. The guide is configured to receive a force from the fluid within pipeline 10 in order to move sealing device 20 through pipeline 10. In another embodiment, sealing device 20 is coupled to pipeline inspection gauge (PIG) 30 (shown in FIG. 4), and is moved or guided through pipeline 10 by PIG 30. PIG 30 may be remotely controlled by an operator or configured to automatically move through pipeline 10 to find leak 18. In other embodiments, sealing device 20 is self-propelled, having one or more components configured to push, move, and/or guide sealing device 20 through pipeline 10. In still other embodiments, sealing device 20 may be configured to move through pipeline 10 in another manner suitable for the particular application of sealing device 20 or for the conditions of pipeline 10.

Sealing device 20 is intended to prevent or limit the loss (i.e., release) of fluid from pipeline 10 through leak 18 by deploying (e.g., inflating) to cover leak 18 (as shown in FIG. 3). In one embodiment, sealing device 20 has an outer diameter approximately equal to an inner diameter of pipeline 10 (e.g., an inner diameter of interior wall 16) when sealing device 20 is inflated, so that sealing device 20 provides a fluid seal against interior wall 16. Sealing device 20 is configured to inflate in response to an inflation pressure. In one embodiment, the inflation pressure is internally generated or provided by one or more components of sealing device 20, such as a pyrotechnic reaction created within bag 22 of sealing device 20. In another embodiment, the inflation pressure is internally generated by an external force or component interacting with sealing device 20, such as a chemical reaction with the fluid within pipeline 10. For instance, sealing device 20 may include or be made from an oxidizer (e.g., oxidizing agent) configured to react with a gaseous fuel present within pipeline 10. The oxidizer may be exposed to the gaseous fuel as necessary or desired in order to create a chemical reaction sufficient to generate or provide the inflation pressure required to inflate sealing device 20. In another embodiment, bag 22 includes a gas generator and the inflation pressure is produced by the gas generator. In other embodiments, the inflation pressure may be internally generated or provided by another source suitable for generating or providing an inflation pressure sufficient to inflate sealing device 20.

Sealing device 20 also includes actuator 34 (e.g., deployment device or inflation actuator, gas generator, etc.). Actuator 34 is configured to be actuated or triggered, causing an inflation pressure sufficient to inflate sealing device 20 to be generated or provided. For instance, actuator 34 may cause or allow a pyrotechnic or chemical reaction when actuated, generating or providing the required inflation pressure to inflate sealing device 20. In one embodiment, actuator 34 exposes an oxidizing agent to a gaseous fuel within pipeline 10 when actuator 34 is actuated, causing a chemical reaction that generates the required inflation pressure to inflate sealing device 20.

Actuator 34 may be coupled to sealing device 20, or actuator 34 may be otherwise positioned in order to cause a sufficient inflation pressure to inflate sealing device 20. In one embodiment, actuator 34 is electronically coupled to one or more components of sealing device 20 and/or the leak sealing system (e.g., sensor assembly 26, control module 50, I/O device 28, etc.), receiving signals or commands to trigger or actuate actuator 34. In one embodiment, actuator 34 is configured to receive wireless signals or commands to trigger or actuate actuator 34, such as through a wireless receiver coupled to sealing device 20. In some embodiments, actuator 34 may be physically triggered or actuated by one or more adjacent components of sealing device 20 and/or the leak sealing system, such as tether 32 described in further detail below.

Still referring to FIGS. 2 and 3, sealing device 20 includes bag 22 (e.g., inflatable envelope, cushion, inflatable bag, etc.) which is configured to expand rapidly (e.g., inflate) in response to the inflation pressure. In some embodiments, bag 22 is sized and shaped to fit interior wall 16, or to otherwise match one or more dimensions of pipeline 10 in order to fit snugly against the perimeter of interior wall 16 when sealing device 20 has been inflated. Bag 22 is configured to at least partially seal a leak within pipeline 10. In other embodiments, bag 22 is sized and shaped to fit and properly seal leak 18 or another type of leak typically found within pipeline 10. In one embodiment, bag 22 is made from a stretchable fabric, but in other embodiments, bag 22 may be made from another material suitable for the particular application of bag 22 and/or sealing device 20. In one embodiment, sealing device 20 includes a secondary inflatable bag (not shown) configured to selectively inflate in order to inhibit a movement of sealing device 20 or one or more of its components (e.g., bag 22, structure 24, etc.).

Sealing device 20 may also include structure 24 (e.g., mechanical element, mechanical structure, internal structure, internal frame, etc.) coupled to bag 22. In one embodiment, structure 24 is made from metal or an otherwise rigid material to provide a frame (e.g., skeleton, framework, form) for sealing device 20. Structure 24 may be positioned on the inside of bag 22 (as shown in the illustrated embodiment of FIGS. 2 and 3), on the outside of bag 22, or in some embodiments is partially located within bag 22. Structure 24 is configured to deploy when sealing device 20 is inflated (i.e., in response to the inflation of sealing device 20), pushing against interior wall 16 and/or bag 22 (depending on whether structure 24 is positioned inside or outside of bag 22). Structure 24 applies a pressure (e.g., mechanical pressure) to bag 22 and/or interior wall 16 in order to substantially cover or seal leak 18, limiting the release of fluid from pipeline 10. According to the illustrated embodiment of FIGS. 2 and 3, when actuator 34 is actuated to generate an inflation pressure, the inflation pressure pushes structure 24 outwardly from an approximate center of sealing device 20, toward interior wall 16. As structure 24 expands outwardly, the inflation pressure forces structure 24 and bag 22 against interior wall 16, generating a wall pressure or force acting on or against interior wall 16.

The inflation pressure may be controlled to limit the wall pressure, including to limit an impulse pressure (i.e. the dynamic or total pressure applied to interior wall 16) and to limit a static pressure (i.e., the pressure applied at a specific point on interior wall 16) acting on interior wall 16. The inflation pressure, and therefore the wall pressure, may be controlled so that interior wall 16 is not compromised or damaged by the inflation pressure and/or wall pressure. The inflation pressure may be controlled by structure 24 and/or bag 22. For instance, in one embodiment, bag 22 is staged (i.e., having more than one stage of inflation) to apply more than one pressure or force, so that the inflation pressure or wall pressure applied by sealing device 20 and/or the staged airbag may be controlled to depend on the magnitude or severity of the leak. In another embodiment, bag 22 includes breakable elements (not shown), or an at least partially breakable element, to reduce the wall pressure (e.g., impulsive load) applied to interior wall 16 as may be necessary or suitable for the particular application of sealing device 20 and/or the conditions of pipeline 10. For example, such breakable elements may comprise fibers attached to multiple sites on the surface of bag 22, either extending from site to site inside bag 22, or along its surface. The length and strength of the fibers can be selected to govern their breakage (and hence braking of the bag expansion) during the expansion of bag 22. In one embodiment, structure 24 is internal to a pressure containment portion (e.g., staged airbag, inflatable elements, etc.) of sealing device 20. In one embodiment, structure 24 is configured to "lock" (e.g., maintain a specific shape or formation) when sealing device 20 is inflated in order to hold sealing device 20 in place or to provide additional strength or wall pressure for sealing device 20. In another embodiment, structure 24 is configured to resist inflation of sealing device 20, such as to reduce a force applied by sealing device 20 to wall 16 of pipeline 10.

In one embodiment, structure 24 has an approximately cylindrical (e.g., substantially cylindrical) shape when sealing device 20 is inflated (as shown in FIG. 3), with support bag 22 forming an approximately cylindrical shape around structure 24. In this embodiment, structure 24 and bag 22 may maintain an approximately (i.e., substantially) cylindrical shape before and after sealing device 20 has been inflated. In one embodiment, sealing device 20 (structure 24 and bag 22) has a substantially toroidal shape, having a shape similar to a toroidal cylinder when sealing device 20 is in the inflated state (similar to the shape of FIG. 3). In this embodiment, fluid is able to flow through an open center (e.g., opening 38 shown in FIG. 3) of sealing device 20 after sealing device 20 has inflated, maintaining a fluid flow through pipeline 10 in spite of the presence of sealing device 20. In other embodiments, structure 24 and/or bag 22 may be sized and/or shaped according to one or more dimensions of pipeline 10. Structure 24 may have an approximately cylindrical shape before and/or after sealing device 20 has been inflated, and bag 22 may have an approximately cylindrical shape before and/or after sealing device 20 has been inflated. In other embodiments, structure 24 and bag 22 may have a non-cylindrical shape before and after sealing device 20 is inflated. In still other embodiments, structure 24 and bag 22 may be of another shape as may be suitable for the particular application of sealing device 20, including having shapes that are dissimilar from each other.

In some embodiments, structure 24 is a single piece configured to apply pressure to bag 22 and/or interior wall 16 when sealing device 20 is inflated. In other embodiments, structure 24 includes two or more pieces or components configured to join together or otherwise couple to each other before, during, or after sealing device 20 has been inflated. In still other embodiments, structure 24 includes two or more pieces or components that remain de-coupled to apply pressure at multiple points on bag 22 and/or interior wall 16, as may be suitable for the particular application of sealing device 20. In one embodiment, structure 24 is configured to deploy into a static configuration to maintain or control a shape of sealing device 20. In this embodiment, the static configuration may be selected to maintain a force applied by sealing device 20 to wall 16 of pipeline 10. Structure 24 may be deployed by a scissor action or another type of extension that is actuated by the inflation pressure or when the inflation pressure is generated (i.e., the inflation pressure can be used to force deployment of structure 24). In one embodiment, structure 24 is attached to bag 22, and is deployed by forces from bag 22 as it inflates. In other embodiments, structure 24 is explosively deployed by a separate energy release than that used to inflate bag 22, although both energy releases may be triggered in response to a common signal. In one embodiment, deployment of structure 24 is configured to control inflation of sealing device 20. Whether having a single piece or more than one component, structure 24 is configured to apply pressure to bag 22 and/or interior wall 16 in order to cover and/or seal the leak.

According to the illustrated embodiment of FIGS. 2 and 3, actuator 34 includes tether 32 (e.g., fixed-length tether). In this embodiment, tether 32 is coupled on a first end to actuator 34 (directly or by another component of sealing device 20), and coupled on a second end to a reference point such as a stationary attachment point (not shown). In some embodiments, tether 32 has a fixed tether length. The fixed tether length may be used to approximate the distance traveled by sealing device 20 through pipeline 10 in order to determine when sealing device 20 reaches a leak location. The fixed tether length may also be selected or cut to approximate the distance from the stationary attachment point to the leak location. When sealing device 20 reaches the leak location, tether 32 may be fully extended or taut such that tether 32 breaks or fails, applying a force that triggers actuator 34, or otherwise causing actuator 34 to trigger such that sealing device 20 is inflated to seal the leak.

The leak sealing system for pipeline 10 also includes sensor assembly 26. Sensor assembly 26 is configured to monitor one or more conditions (i.e., pipeline condition(s)) related to sealing device 20, pipeline 10, and/or any other conditions relevant to the leak sealing system or its components (e.g., flow velocity within pipeline 10, velocity of sealing device, dimensions of pipeline 10, etc.). In the illustrated embodiment of FIGS. 2 and 3, sensor assembly 26 is coupled to sealing device 20, but in other embodiments sensor assembly 26 may be otherwise located or positioned within pipeline 10, such as coupled to interior wall 16 or positioned within block valve 12, in order to monitor the pipeline conditions. Sensor assembly 26 is configured to monitor the pipeline conditions and send one or more signals representing the pipeline conditions to one or more other components of the leak sealing system.

In one embodiment, sensor assembly 26 is configured to electronically communicate with control module 50, sending one or more signals representing the pipeline conditions to control module 50. Control module 50 is configured to receive the signals and to create a response based on the signals. In one embodiment, control module 50 is programmed to use or interpret the signals to determine (i.e., calculate) other important characteristics or conditions of the leak sealing system, such as the leak location, the size and shape of the leak (e.g., the hole causing the leak), the position of sealing device 20 (i.e., sealing device location), or any other characteristics or conditions of the leak sealing system. Control module 50 may also be configured to send a response (e.g., signals, commands, etc.) to other components of the leak sealing system. For instance, in one embodiment control module 50 is programmed to determine the leak location and the sealing device location, and to cause sealing device 20 to inflate based on the leak location and the sealing device location. In this embodiment, control module 50 is configured to send a signal or command to actuator 34 to generate the inflation pressure. Control module 50 may be programmed to send one or more signals to trigger actuator 34 when sealing device 20 is at or near the leak location (e.g., the leak location is approximately equal to the sealing device location), causing sealing device 20 to inflate in order to seal the leak.

In the illustrated embodiment of FIGS. 2 and 3, sealing device 20 includes I/O device 28 (input/output device) coupled to sealing device 20. I/O device 28 may be electronically connected to sensor assembly 26 and to control module 50. I/O device 28 may relay signals or commands between sensor assembly 26 and control module 50. In one embodiment, sensor assembly 26 is configured to send one or more signals representing the pipeline conditions to I/O device 28, with I/O device 28 sending the signals or other data to control module 50. I/O device 28 may be further configured to receive signals, commands, or data from control module 50, and to send signals or commands to other components of sealing device 20 (e.g., actuator 34) and/or the leak sealing system. For instance, control module 50 may interpret the pipeline conditions to determine a leak location and the sealing device location, sending a command through I/O device 28 to actuator 34 when sealing device 20 is near the leak location, inflating sealing device 20 to seal the leak. In an embodiment, I/O device 28 is used to "arm" actuator 34 (e.g., on remote determination of a leak, on the dispatch of sealing device 20, etc.), in effect authorizing its activation, but leaving the actual decision and timing of the activation up to onboard sensors (e.g., upon a local determination of sealing device 20's proximity to the leak).

In at least one embodiment, sensor assembly 26 is programmed to interpret the pipeline conditions, and configured to send one or more signals or commands to at least one other component of sealing device 20 and/or the leak sealing system based on the pipeline conditions. For instance, sensor assembly 26 may interpret the pipeline conditions to calculate or determine the leak location and the sealing device location, sending a signal or command to actuator 34 when sealing device 20 is near (e.g., at or just upstream of) the leak location, inflating sealing device 20 and sealing the leak.

In one embodiment, sensor assembly 26 includes one or more position sensors (i.e., sealing device position sensors) configured to monitor a position of sealing device 20 (e.g., position relative to pipeline 10, position relative to the leak, etc.). In some embodiments, sensor assembly 26 is configured to send one or more signals representing the position of sealing device 20 to control module 50, either directly or by way of I/O device 28. Control module 50 may interpret the signals received from sensor assembly 26 to monitor the sealing device location. In some embodiments, control module 50 is programmed to cause sealing device 20 to inflate based on the sealing device location. For instance, control module 50 may send a signal or command to actuator 34, either directly or through I/O device 28, when the sealing device location is approximately equal to the leak location (i.e., sealing device 20 is at or near leak 18), inflating sealing device 20 to seal leak 18. In another embodiment, sensor assembly 26 is configured to send a signal or command directly to actuator 34, causing sealing device 20 to inflate based on the sealing device location.

Sensor assembly 26 may also include one or more fluid sensors (e.g., flow sensors, flow meters, flow loggers, velocimeters, etc.) configured to monitor a fluid flow within pipeline 10. In this embodiment, the flow sensors are coupled to sealing device 20 and configured to monitor a fluid flow (e.g., flow velocity, volumetric flow rate, etc.) in the area of sealing device 20. By monitoring the fluid flow, the flow sensors (and therefore sensor assembly 26) may be configured to detect the presence of a leak within pipeline 10. In one embodiment, flow sensors 14 are positioned at intervals within pipeline 10 in order to identify a leak or a leak location. In this embodiment, fluid sensors (which may be similar to flow sensors 14) are included as part of sensor assembly 26 and coupled to sealing device 20. The flow sensors of sensor assembly 26 are configured to monitor the fluid flow or fluid conditions in the area of sealing device 20 in order to identify or determine when sealing device 20 is at or near the leak location.

In one embodiment, sensor assembly 26 is configured to send one or more signals representing the fluid flow at or near sensor assembly 26 to control module 50, either directly or through I/O device 28. Control module 50 is configured to interpret the signals to identify a potential leak and/or the leak location. Control module 50 may be programmed to send a signal or command to actuator 34 when sealing device 20 is at or near the leak location, causing actuator 34 to inflate sealing device 20. In one embodiment, sensor assembly 26 is configured to interpret the monitored fluid flow to determine the leak location. Sensor assembly 26 may be configured to send one or more signals representing the leak location to control module 50, or to send a signal or command to actuator 34 when sealing device 20 is at or near the leak location, causing actuator 34 to inflate sealing device 20 in order to cover and/or seal leak 18. For instance, sensor assembly 26 may be configured to detect a flow disturbance (e.g., a change in volumetric flow rate or fluid flow velocity at or near sensor assembly 26), sending one or more signals to actuator 34 when a flow disturbance is detected near sensor assembly 26 (and thus sealing device 20), causing actuator 34 to inflate sealing device 20.

Sensor assembly 26 may also include one or more light sensors (e.g., radiometric sensors, photometric sensors, etc.) configured to detect a light (e.g., a light source, a light source gradient) near sensor assembly 26. The light sensors may be coupled to sealing device 20 as part of sensor assembly 26 in order to determine whether a leak is present at or near sealing device 20. For instance, if a leak or rupture is present within pipeline 10, a greater amount of ambient light may enter pipeline 10 through the leak or rupture. The light sensors of sensor assembly 26 are configured to monitor or detect this ambient light to determine a leak location.

In one embodiment, sensor assembly 26 is configured to send one or more signals representing the amount of light received or detected by sensor assembly 26 to control module 50. In this embodiment, control module 50 is programmed to determine whether a leak condition is present based on the signals received from sensor assembly 26. In some embodiments, control module 50 compares the amount of ambient light detected or received by sensor assembly 26 to a steady state light level (i.e., a steady state illumination) for when pipeline 10 is substantially leak-free. The steady state light level may be manually programmed or entered into control module 50, or control module 50 may be programmed to calculate or estimate the steady state light level based on the particular conditions of pipeline 10. If the ambient light detected or received by sensor assembly 26 is greater than the steady state light level, control module 50 may be programmed to send a signal or command to actuator 34, causing actuator 34 to inflate sealing device 20 to seal the leak. In another embodiment, sensor assembly 26 is configured to interpret the light received or detected by sensor assembly 26 to determine whether a leak is present at or near sensor assembly 26. In this embodiment, sensor assembly 26 may send a signal or command to actuator 34 to inflate sealing device 20 and seal a potential leak. Sealing device 20 is configured to cover and/or seal the leak when inflated, limiting the release of fluid from pipeline 10.

Sensor assembly 26 may also include one or more radio frequency (RF) sensors configured to detect a radio frequency signal or field. When pipeline 10 is structurally sound (i.e., having no leaks or ruptures), an RF field may not be present within pipeline 10, or pipeline 10 may contain an RF field having a relatively low intensity. However, when a leak occurs within pipeline 10, an ambient RF signal (e.g., from local radio, TV, or cellular phone systems) may enter pipeline 10 so that an RF field (e.g., ambient RF field) having a relatively higher intensity is present within pipeline 10. The RF sensors of sensor assembly 26 are configured to monitor the RF field (e.g., the presence and/or intensity of the RF field). In one embodiment, sensor assembly 26 is coupled to sealing device 20 and the RF sensors are configured to detect the RF field at or near sealing device 20, generating one or more signals representing the RF field at or near sealing device 20. Sensor assembly 26 may be configured to send the one or more signals to control module 50, or to another component of sealing device 20 and/or the leak sealing system. In one embodiment, control module 50 is configured to receive the one or more signals, and is programmed to determine whether a leak condition is present near sensor assembly 26 (and thus near sealing device 20) based on the one or more signals. Control module 50 may be programmed to compare the RF field to a steady state RF field (e.g., an RF field typically associated with a substantially leak-free or structurally sound pipeline 10), and to determine whether a leak condition is present near sensor assembly 26 based on the relationship between the received or detected RF field and the steady state RF field. In one embodiment, a leak can be detected by generating an RF field within pipeline 10 and then detecting it by an externally located sensor assembly (e.g., sensor assembly 26). In this embodiment, the generated RF field can be distinguished from ambient RF fields by generating it with distinctive frequency, timing, or encoding. Control module 50 may send a signal or command to actuator 34 to inflate sealing device 20 when a leak condition is present, such as when sealing device 20 is at or near a leak location.

In another embodiment, sensor assembly 26 is configured or programmed to interpret the RF field detected or received by sensor assembly 26 in order to determine whether a leak condition is present at or near sensor assembly 26 (e.g., whether sensor assembly 26 is at or near a leak location), and to send a signal or command to actuator 34 to inflate sealing device 20 when sensor assembly 26 (and thus sealing device 20) is at or near the leak location. In order to determine whether a leak condition is present, sensor assembly 26 may compare the RF field received or detected by sensor assembly 26 to the steady state RF field. The steady state RF field may be determined based on data entered or programmed (through I/O device 28 or otherwise) to control module 50 or sensor assembly 26 by an operator, or may be based on particular conditions of pipeline 10.

In some embodiments, the leak sealing system is configured such that when sealing device 20 is at or near a leak location, sealing device 20 is automatically (i.e., without operator or other manual intervention) inflated to seal or cover the potential leak. For instance, control module 50 may be programmed to automatically send a command or signal to actuator 34 when the leak sealing system determines that a leak is present within pipeline 10 at or near sealing device 20, causing actuator 34 to generate the inflation pressure necessary to inflate sealing device 20. In other embodiments, the leak sealing system is configured to provide an alert when a leak condition is present. For instance, control module 50 may provide one or more audible, visual, or other sensory alerts or warnings (e.g. warning light, noise, alarm, haptic joystick, etc.), so that an operator or technician associated with pipeline 10 is able to perceive or sense the alert. The alert may continue until the operator or technician takes an appropriate or required action, such as inflating sealing device 20 at or near the leak location. In one embodiment, control module 50 is programmed or configured to close or actuate block valves 12 surrounding the leak location when a leak is detected within pipeline 10, blocking fluid flow through the segment or section of pipeline 10 containing the leak. In this embodiment, block valves 12 may remain closed until an operator or technician takes an appropriate or required action. For instance, the operator may be required to remotely control sealing device 20, moving sealing device 20 to the leak location. Control module 50 may be configured to maintain block valves 12 in a closed position until sealing device 20 reaches closed block valve 12, at which point control module 50 may open block valve 12 so that the operator is able to remotely move sealing device 20 to the leak location, remotely inflating sealing device 20 to cover and/or seal the leak.

Sealing device 20 may be inflated when sealing device 20 is stationary at the leak location, or sealing device 20 may be inflated as sealing device 20 moves toward or past the leak location. In one embodiment, the movement of sealing device 20 is controlled (i.e., by control module 50, remote control, or otherwise) such that when a leak condition is present within pipeline 10, sealing device 20 is moved to the leak location. Sealing device 20 is then stopped such that sealing device is substantially stationary at the leak location. In this embodiment, actuator 34 may be actuated only after sealing device is substantially stationary at or near the leak location. Sealing device 20 may be slowed or stopped at the leak location by inflation of a secondary airbag (e.g., secondary inflatable bag) to brake against wall 16, by a magnetic anchor to grip wall 16, by an external tether (e.g., tether 32), or by stopping or reversing a propulsion system of sealing device 20. The position and/or movement of sealing device 20 may be relayed or determined by sensor assembly 26 and/or control module 50 in this embodiment. In other embodiments, actuator 34 may be configured such that actuator 34 may only be triggered or actuated at a location just before sealing device 20 reaches the leak location and while sealing device 20 is moving, at a location just after sealing device 20 has reached the leak location and while sealing device 20 is moving, or under any other conditions as may be suitable for the particular application of sealing device 20. For instance, the timing of the actuation of actuator 34 may be selected or determined such that sealing device 20 is inflated to substantially cover or seal the leak.

In some embodiments, sealing device 20 is moved through pipeline 10 and to a leak site or location by rocket-type propulsion. In one embodiment, sealing device 20 includes a bi-propellant rocket having solid or liquid fuel and configured to propel sealing device 20 through pipeline 10 as may be necessary for the leak sealing system. In another embodiment, sealing device 20 includes a mono-propellant rocket, jet, or engine (e.g., an on-board oxidizer reacting with natural gas or another gaseous fuel within pipeline 10) configured to propel sealing device 20 through pipeline 10.

In some embodiments, sealing device 20 is configured to attach to interior wall 16 (i.e., stick in place or stick to interior wall 16) once sealing device 20 is inflated. For instance, sealing device 20 may comprise a magnet designed to grip wall 16. Bag 22 may be coated with a sealant or adhesive in one embodiment, adhering to interior wall 16 of pipeline 10 after sealing device 20 is inflated. The sealant or adhesive may be contained within bag 22 when sealing device 20 is in the uninflated state, and may be released or extruded from bag 22 upon inflation of sealing device 20. The sealant or adhesive may be a glue or some other type of material or compound configured to adhere to interior wall 16 and substantially attach bag 22 and sealing device 20 to interior wall 16. The sealant or adhesive may be used for inhibiting movement of sealing device 20 or one or more of its components relative to pipeline 10. In another embodiment, sealing device 20 includes a gel or foam, or other rigidizing substance which forms in place after sealing device 20 has inflated. The gel or foam may be internal to bag 22 (or otherwise inside sealing device 20), forming in place within bag 22 after inflation to rigidize and hence maintain bag 22's shape, or to modify the wall pressure applied by sealing device 20. The gel or foam may also be a type of adhesive extruded from bag 22 or another component of sealing device 20 to adhere sealing device 20 and/or bag 22 to interior wall, providing a stronger seal.

Figure 4:
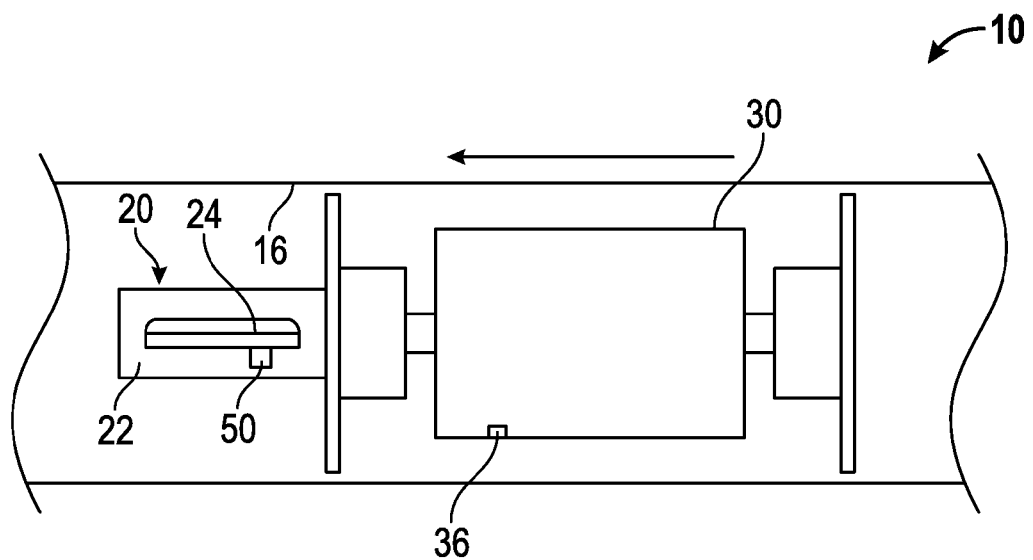
FIG. 4 is a schematic view of a sealing device and a pipeline inspection gauge within the fluid pipeline according to one embodiment.

Referring now to FIG. 4, sealing device 20 is shown being moved within pipeline 10 by pipeline inspection gauge 30 (PIG) according to one embodiment. In this embodiment, PIG 30 is configured to move through pipeline 10, being sized and shaped to fit pipeline 10 and to crawl along interior wall 16. PIG 30 may be utilized to move sealing device 20 as necessary within pipeline 10 as PIG 30 moves through pipeline 10. In one embodiment, PIG 30 is positioned behind sealing device 20 and configured to push or move sealing device 20 to a leak location to cover or seal the leak. Sealing device 20 may also be coupled to PIG 30, moving with PIG 30 to a leak location in order to cover or seal the leak. Once sealing device 20 has been inflated, PIG 30 may be moved to another location within pipeline 10 or removed from pipeline 10. PIG 30 may be remotely controlled by an operator or technician, or may automatically move to a leak location when a leak is identified within pipeline 10. In one embodiment, control module 50 is configured to communicate with PIG 30, sending commands or instructions to PIG 30 in order to move PIG 30 to a desired location. PIG 30 may include location sensor 36 configured to monitor or detect a global location of PIG 30 within pipeline 10. Location sensor 36 may be configured to communicate with control module 50, sending one or more signals representing the position or global location of PIG 30 to control module 50. Control module 50 may use or interpret signals received from PIG 30 as part of the leak sealing system to cover or seal one or more leaks within pipeline 10.

Figure 5:
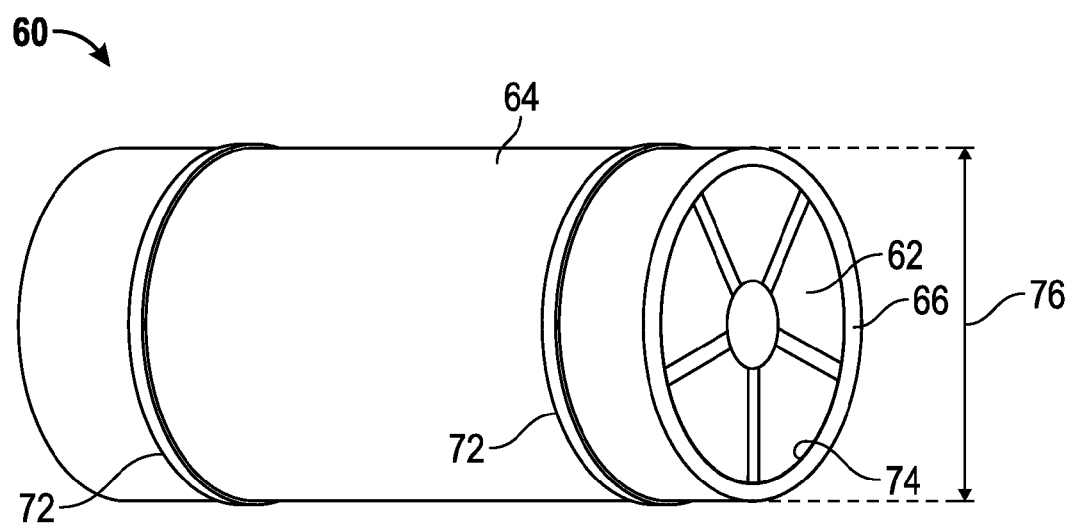
FIG. 5 is a perspective view of a sealing device for the leak sealing system according to one embodiment.
Figure 6:
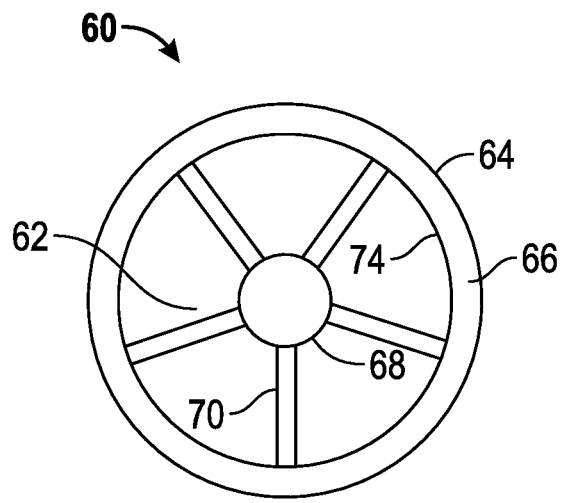
FIG. 6 is a side plan view of the sealing device of FIG. 5 according to one embodiment.

Referring now to FIGS. 5 and 6, sealing device 60 is shown for the leak sealing system. Sealing device 60 is similar to sealing device 20 and may be used to seal a leak within pipeline 10. Sealing device 60 (e.g., tubular device, sealing device, etc.) is configured to move to the site of a leak in pipeline 10 (e.g., leak site, leak location, etc.), applying a force to the leak such that the leak is covered or sealed (i.e., fluid is prevented or inhibited from exiting pipeline 10 through the leak). When sealing device 60 is deployed or actuated at or near the leak location, sealing device 60 may expand or otherwise create a force or wall pressure that acts against interior wall 16 to cover and/or seal the leak. In some embodiments, sealing device 60 may include an actuator similar to actuator 34 for deploying sealing device 60. According to the illustrated embodiments of FIGS. 5 and 6, sealing device 60 has a substantially tubular (i.e., cylindrical, circular) shape, including opening 62 that runs through the center of sealing device 60. Opening 62 is sized and shaped such that fluid is able to pass through sealing device 60 as sealing device 60 crawls or moves through pipeline 10. Fluid is also able to pass through opening 62 when sealing device 60 is actuated or deployed, preserving the fluid flow through pipeline 10 and past the leak location. In the illustrated embodiments of FIGS. 5 and 6, sealing device 60 includes wall 66 (e.g., flexible wall, closed flexible wall) forming a substantially tubular (e.g., toroidal) shape defining opening 62 and extending the length of sealing device 60. Wall 66 may enclose a pressurized volume of fluid (e.g., air) having a pressure that is less than that of the fluid within pipeline 10. In one embodiment, wall 66 expands outward and toward interior wall 16, applying a wall pressure or force to interior wall 16 as may be necessary to seal the particular leak. Wall 66 includes inner surface 74 forming the interior surface of sealing device 60 and outer surface 64 forming the exterior surface of sealing device 60. Outer surface 64 and inner surface 74 may each have a tubular or cylindrical shape to match the overall shape of sealing device 60. In one embodiment, diameter 76 of sealing device 60 (i.e., the diameter of outer surface 64) may be approximately equal to the inner diameter of pipeline 10 (i.e., diameter of interior wall 16) in order to provide an adequate seal for a leak within wall 16 of pipeline 10. In other embodiments, sealing device 60 may be sized or shaped to fit another dimension of pipeline 10. In still other embodiments, sealing device 60 and its components may have other dimensions suitable for the particular application of sealing device 60 and/or the leak sealing system.

In one embodiment, wall 66 is generally flexible, such that sealing device 60 is able to move through pipeline 10 by crawling or thrusting forward incrementally with a caterpillar-like movement or action. In this embodiment, wall 66 is configured to fold, bend, or otherwise flex in order to create a friction between outer surface 64 and interior wall 16 of pipeline 10 sufficient to drive sealing device 60 through pipeline 10. For example, sealing device 60 may impose a high friction force between outer surface 64 and interior wall 16 at a front portion of sealing device 60, while flexing rearward portions of wall 66 (e.g., via internal structure 68) so as to move a back portion of sealing device 60 forward. Sealing device 60 may then impose a high friction force between outer surface 64 and interior wall 16 at the back portion while flexing forward portions of wall 66 (e.g., via internal structure 68), so as to move the front portion of sealing device 60 forwards. This process can be cyclically repeated to achieve an inchworm-like motion through pipeline 10. Wall 66 is also configured to stop movement of sealing device 60 along pipeline 10 when sealing device 60 is deployed. In another embodiment, sealing device 60 is configured to move along with the fluid within pipeline 10, being driven by the fluid flow through pipeline 10. In this embodiment, wall 66 is flexible enough that fluid flow through pipeline 10 creates shear forces on inner surface 74 and/or sealing device 60 to crawl or move sealing device 60 through pipeline 10, but wall 66 is stiff enough (by itself, or aided by internal structure 68) to maintain inner surface 74 in contact with interior wall 16 and to prevent wall 66 from collapsing across the bore of pipeline 10. In this embodiment, wall 66 must also be stiff enough to provide a sufficient sealing force against interior wall 16 to seal a leak within pipeline 10. The flexibility and/or stiffness of wall 66 may be controlled by internal structure 68 (i.e., structure), which is shown in FIG. 6 and described in further detail below. In another embodiment, wall 66 undergoes annular tank-tread like motion, with inner surface 74 moving forward, then reversing direction at the leading edge of wall 66, moving backwards as outer surface 64, and again reversing direction at the trailing edge of wall 66, resuming forward motion as inner surface 74. A propulsive force is provided by friction between outer surface 64 and interior wall 16, and the work to induce this motion can come from fluid shear forces acting on inner surface 74 or (as in a tank) from drive wheels connected to internal structure 68. In one embodiment, wall 66 includes a pipeline-facing surface (e.g., outer surface 64) and a fluid-facing surface (e.g., inner surface 74). In this embodiment, the pipeline-facing surface and the fluid-facing surface may be configured to repetitively change places with one another as sealing device 60 moves along pipeline 10.

Sealing device 60 may also include external structures 72 positioned on outer surface 64 and configured to control the flow and speed of sealing device 60 as sealing device 60 moves through pipeline 10. External structures 72 may be raised from outer surface 64 in one embodiment. In another embodiment, external structures 72 may be made from a material configured to grip interior wall 16 in order to produce a greater friction between outer surface 64 and interior wall 16. External structures 72 may be configured to control a propulsive force of the fluid within pipeline 10 on sealing device 60. In other embodiments, external structures 72 may be otherwise configured or positioned for controlling the flow and speed of sealing device 60, as may be suitable for the particular application of sealing device 60 and/or the leak sealing system.

Sealing device 60 is utilized similarly to sealing device 20 to seal one or more leaks within pipeline 10. The embodiments and configurations described above in reference to sealing device 20 may also apply to sealing device 60. As an example, sealing device 60 may be configured to communicate or interact with one or more communication components (e.g., control module 50, I/O device 28, or sensor assembly 26, etc.) of the leak sealing system in a manner similar to the communication or interaction between sealing device 20 and the one or more communication components, and any embodiments or configurations describing any communications or interactions between sealing device 20 and the one or more communication devices apply accordingly to sealing device 60.

As shown in the illustrated embodiment of FIG. 6, sealing device 60 includes internal structure 68 (i.e., structure or mechanical structure) coupled to inner surface 74 of wall 66. Internal structure 68 is configured to control the movement of sealing device 60, moving arms 70 to bend, flex, or otherwise shape wall 66 as may be suitable or necessary for the particular application of sealing device 60. Internal structure 68 may also control the stiffness of wall 66, moving arms 70 to stiffen or flex wall 66 as may be necessary or useful for the particular application of wall 66 and/or sealing device 60. In one embodiment, the stiffness of wall 66 is maintained or controlled by internal structure 68 such that the fluid flow through pipeline 10 creates a shear force acting on inner surface 74 to move sealing device 60 through pipeline 10, but wall 66 is stiff enough (by itself, or aided by internal structure 68) to maintain inner surface 74 in contact with interior wall 16 and to prevent wall 66 from collapsing across the bore of pipeline 10. In at least one embodiment, internal structure 68 is commanded or controlled to move by an external source, such as the one or more communication components of the leak sealing system. In one embodiment, internal structure 68 is configured to receive signals or commands from control module 50, and to control the movement of sealing device 60 based on the signals or commands received from control module 50. In this embodiment, control module 50 may also be configured to receive signals representing pipeline conditions from sensor assembly 26, the signals or commands sent to internal structure 68 may be based on those signals received from sensor assembly 26. In another embodiment, an operator or technician may enter an input (e.g., information or data) to control module 50, and control module 50 may send one or more signals or commands to internal structure 68 based on that input. Internal structure 68 may then cause sealing device 60 and/or one or more components of sealing device 60 to move according to the operator or technician input.

In another embodiment, internal structure 68 is configured to receive one or more signals representing pipeline conditions directly from sensor assembly 26. In this embodiment, internal structure 68 may be configured to interpret the signals to determine if it is necessary or useful for internal structure 68 to move sealing device 60 and/or one or more components of sealing device 60 in order to fulfill a function or purpose of the leak sealing system. Internal structure 68 may then move or control sealing device 60 accordingly. In this embodiment, sensor assembly 26 may be coupled to sealing device 60 so that sensor assembly 26 is able to monitor the conditions near sealing device 60. In other embodiments, sensor assembly 26 may be coupled to interior wall 16 of pipeline 10, or may be positioned in another location suitable for monitoring one or more conditions within pipeline 10.

In one embodiment, internal structure 68 controls the movement of sealing device 60 in order to move sealing device 60 to a leak location to seal a leak. In this embodiment, a leak is identified within pipeline 10 by flow sensors 14, sensor assembly 26, or otherwise, and sealing device 60 is moved toward the leak location by the movement of internal structure 68. Arms 70 of internal structure 68 are moved to interact with wall 66 such that wall 66 is bent, flexed, or otherwise manipulated to force sealing device 60 to crawl through pipeline 10 and toward the leak location. In one embodiment, sensor assembly 26 is coupled to sealing device 60 and is configured to monitor the pipeline conditions to determine the precise leak location. When sealing device 60 reaches the leak location, sealing device 60 is configured to deploy or actuate to apply a pressure to wall 16 and seal the leak.

In one embodiment, internal structure 68 receives a signal or command indicating sealing device 60 is at or near the leak location, and in response applies an outward pressure to wall 66. Internal structure 68 is configured to control the stiffness of wall 66 by applying a greater or lesser outward pressure to wall 66. When sealing device 60 is at or near the leak location, arms 70 may push outward from the center of internal structure 68 to apply an outward force or pressure in all directions, increasing the stiffness of wall 66. The outward force applied and increased stiffness of wall 66 is intended to provide a seal over the leak. Internal structure 68 is also configured to stop movement of sealing device 60 along pipeline 10 when sealing device 60 is deployed. The outward force may also be applied to prevent the collapse of pipeline 10 across its diameter in instances where the structure of pipeline 10 is substantially harmed by the leak. The outward force may also be applied by internal structure 68 to prevent internal collapse of wall 66. In one embodiment, internal structure 68 includes plates or other accessories or components to increase the surface area over which the outward force is applied to wall 66, more evenly distributing the wall pressure or outward force to obtain a better seal. In one embodiment, wall 66 is made from a material configured to provide a water-tight seal over the leak.

In one embodiment, wall 66 is made from or includes one or more non-Newtonian materials or fluids (i.e., materials or fluids having a non-linear or non-Newtonian viscosity). The non-Newtonian materials or fluids are configured to at least partially enable movement (i.e., motion) through pipeline 10 and to a create a stiffer wall 66 to cover the leak or rupture upon deployment of sealing device 60. In other embodiments, wall 66 may be made from or include another material configured to improve the sealing properties of wall 66 and/or sealing device 60, or any other material suitable for the particular application of sealing device 60 and/or the leak sealing system.

The above described sealing devices (sealing device 60 and sealing device 20) may be selectively positioned and/or deployed within pipeline 10. In one embodiment, at least one sealing device is positioned between every block valve 12 within pipeline 10. In other embodiments, sealing devices may be positioned at lesser intervals within pipeline 10 in order to achieve greater coverage. The sealing devices may each have a designated area (i.e., pipe segment(s)) within pipeline 10 in which the sealing devices move in order to detect a leak condition. Sealing devices may be launched or moved continuously or intermittently through their designated pipe segment to provide substantially continuous coverage against leaks within pipeline 10. The sealing devices may be launched every few minutes or in shorter or longer time intervals as may be suitable for the particular application of the sealing devices and/or the leak sealing system. In one embodiment, a single sealing device is configured to move back and forth from one end of the pipe segment to the other end of the pipe segment until a leak is detected, at which point the sealing device moves to the leak location and is actuated or deployed to seal the leak. In another embodiment, a sealing device may initially be at a fixed position within pipeline 10, but is then dispatched toward a leak once a leak has been detected.

Figure 7:
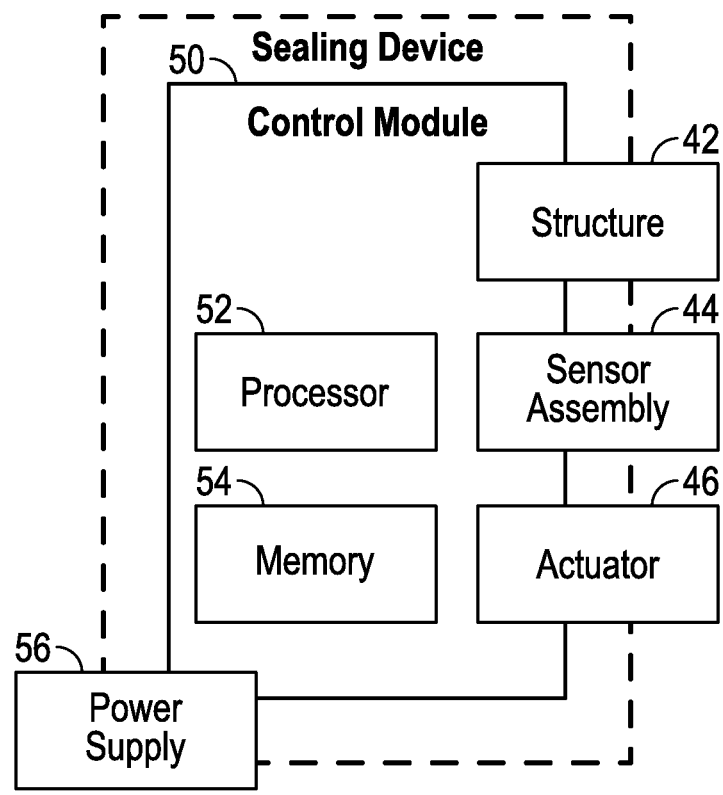
FIG. 7 is a block diagram of a control module for a sealing device according to one embodiment.

Referring now to FIG. 7, a block diagram of control module 50 is shown according to one embodiment. Control module 50 may be used to control the movement and/or operation of either of the above described sealing devices (i.e., sealing device 20 or sealing device 60) or a similarly configured sealing device. Control module 50 includes processor 52 and memory 54. Memory 54 stores programming instructions that, when executed by processor 52, control the sealing device's movement, including the various components of the sealing device. Control module 50 is in electrical communication with structure 42, sensor assembly 44, and actuator 46. As described above with respect to sealing devices 20 and 60, a sealing device may include structures, sensor assemblies, and actuators. In such arrangements, control module 50 is in electrical communication with each of the components.

Control module 50 receives operational electrical power from power supply 56. Power supply 56 provides power to control module 50 and all components of the sealing device. Power supply 56 may be any suitable power source, including, but not limited to, a battery, a generator, a solar power source, grid power, or a combination thereof. In arrangements where power supply 56 includes a rechargeable battery, the battery may be charged during operation through another power source (e.g., a generator, a solar panel, grid power, etc.) or through inductive charging (i.e., the sealing device can move over an inductive charger within pipeline 10 configured to charge the rechargeable battery).

Figure 8:
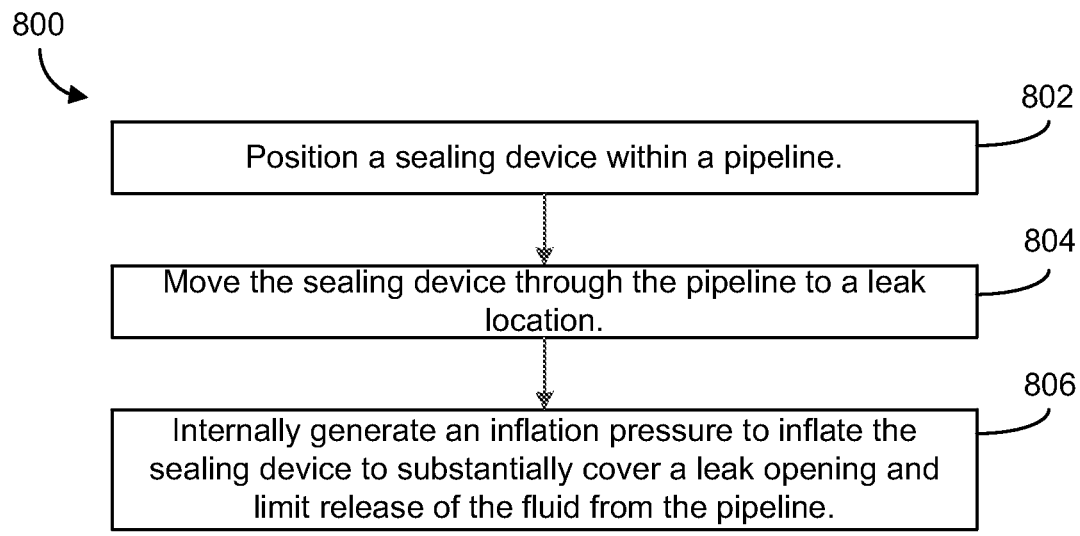
FIG. 8 is a flow chart of a method for identifying a leak within the pipeline.

Referring now to FIG. 8, a flow chart diagram for method 800 for sealing a leak in pipeline 10 is shown according to one embodiment. Method 800 may be employed by either of the above described sealing devices (i.e., sealing device 20 and/or sealing device 60) or another sealing device configured to seal a leak within a pipeline. At 802, the sealing device is positioned within pipeline 10. The sealing device may be a single sealing device positioned within pipeline 10 and configured to seal a leak anywhere within pipeline 10, or the sealing device may be one of a plurality of sealing devices and configured to seal a leak within a specified segment or area of pipeline 10. At 804, the sealing device is moved through pipeline 10 to a leak location. The leak location may be identified by flow sensors 14 or manually identified by an operator or technician and relayed to the sealing device (i.e., by control module 50), identified by one or more sensors of sensor assembly 26, or identified by another method or component of the leak sealing system such as those described above. The sealing device may be moved through pipeline 10 by tether 32, PIG 30, or by another component or method of the leak sealing system. Once the sealing device reaches the leak location, at 806, an inflation pressure is internally generated within the sealing device to inflate the sealing device, substantially covering the leak opening and limiting the release of fluid from pipeline 10. The sealing device may be inflated by triggering actuator 34 or by causing a structure of the sealing device to apply an outward force to seal the leak opening.

The construction and arrangement of the apparatus, systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the described embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such joining may be communicative, rather than physical.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for sealing a leak in a pipeline used to transport fluid, the method comprising:
   positioning a sealing device within the pipeline, the sealing device comprising an inflatable bag and an adhesive;
   moving the sealing device through the pipeline to a leak location; and
   limiting the release of fluid from the pipeline at the leak location by:
      internally generating an inflation pressure to inflate the inflatable bag to substantially cover a leak opening at the leak location; and
      adhering the sealing device to an interior wall of the pipeline at the leak location using the adhesive.

2. The method of claim 1, wherein the sealing device includes more than one stage to control the inflation pressure.

3. The method of claim 1, wherein inflating the sealing device generates a wall pressure acting on an interior wall of the pipeline.

4. The method of claim 3, further comprising:
   limiting the wall pressure by controlling the inflation pressure.

5. The method of claim 3, wherein the inflatable bag is at least partially breakable to control the wall pressure.

6. The method of claim 1, wherein the sealing device includes a mechanical element configured to deploy in response to inflating the sealing device.

7. The method of claim 6, wherein the inflation pressure causes the mechanical element to apply a mechanical pressure to an interior wall of the pipeline.

8. The method of claim 1, wherein the sealing device is shaped such that the fluid is able to pass through the pipeline and past the leak location once the sealing device has been inflated.

9. The method of claim 1, further comprising:
selecting the sealing device based on a dimension of the pipeline.

10. The method of claim 1, wherein the inflatable bag is inflated based on a sealing device location.

11. The method of claim 10, further comprising:
determining the sealing device location based on a signal received from a sensor assembly.

12. The method of claim 1, further comprising:
coupling the sealing device to a pipeline inspection gauge;
wherein the sealing device is moved to the leak location by moving the pipeline inspection gauge to the leak location.

13. The method of claim 1, wherein the sealing device includes a sealant for sealing the leak, and wherein the sealing device is configured to extrude the sealant from the sealing device when the sealing device is deployed.

14. The method of claim 1, further comprising:
identifying the leak location based on a signal received from a sensor assembly.

15. A sealing device for sealing a leak within a pipeline for transporting fluid, the sealing device comprising:
a frame; and
an inflatable bag coupled to the frame and sized according to one or more dimensions of the pipeline;
wherein the frame and the inflatable bag are configured to move through the pipeline; and
wherein the inflatable bag comprises a gas generator and is configured to at least partially seal the leak and to inhibit release of the fluid from the pipeline when the inflatable bag is inflated.

16. The sealing device of claim 15, wherein the inflatable bag is configured to inflate in response to an inflation pressure produced by the gas generator.

17. The sealing device of claim 16, wherein the inflatable bag includes an at least partially breakable element for controlling inflation of the inflatable bag.

18. The sealing device of claim 15, wherein the sealing device comprises an opening for the fluid to flow through the sealing device when the sealing device is inflated.

19. The sealing device of claim 15, further comprising:
a sensor assembly configured to monitor a pipeline condition and send a signal representing the pipeline condition; and
a control module configured to identify a leak location based on the signal.

20. The sealing device of claim 15, wherein the sealing device is configured to move with a fluid flow through the pipeline.

21. The sealing device of claim 15, further comprising an adhesive configured to adhere the sealing device to an interior wall of the pipeline.

22. The sealing device of claim 15, further comprising a sealant configured to seal the leak.

23. The sealing device of claim 15, wherein the frame includes a mechanical structure configured to deploy in response to inflating the inflatable bag and apply a wall pressure to an interior wall of the pipeline.

24. A sealing device for sealing a leak within a pipeline for transporting fluid, the sealing device comprising:
a closed flexible wall formed into a substantially tubular shape defining an opening; and
an internal frame coupled to the closed flexible wall and configured to control a movement of the closed flexible wall by applying a force to the closed flexible wall;
wherein the movement of the closed flexible wall moves the sealing device through the pipeline, the internal frame being configured to control a stiffness of the closed flexible wall such that a fluid flow through the pipeline creates a shear force acting on the closed flexible wall to move the sealing device through the pipeline; and
wherein the sealing device may be deployed in order to seal the leak.

25. The sealing device of claim 24, wherein the movement of the closed flexible wall causes the sealing device to thrust forward incrementally to move through the pipeline.

26. The sealing device of claim 24, wherein the closed flexible wall includes a pipeline-facing surface and a fluid-facing surface, and wherein the pipeline-facing surface and the fluid-facing surface are configured to repetitively change places with one another as the sealing device moves along the pipeline.

27. The sealing device of claim 24, wherein the stiffness of the closed flexible wall is controlled such that the closed flexible wall applies a force against an interior wall of the pipeline to seal the leak.

28. The sealing device of claim 24, wherein the internal frame is configured to apply an outward pressure to the closed flexible wall to prevent collapse of an interior wall of the pipeline.

29. The sealing device of claim 24, wherein the closed flexible wall includes external structures positioned on an outer surface of the closed flexible wall and configured to control a speed of the sealing device as the sealing device moves through the pipeline.

30. The sealing device of claim 24, wherein the closed flexible wall is configured to expand outwardly to apply a wall pressure to an interior wall of the pipeline when the sealing device is deployed.

31. The sealing device of claim 24, further comprising a sensor assembly configured to monitor a pipeline condition for identifying a leak location.

32. The sealing device of claim 24, further comprising an adhesive configured to adhere the sealing device to an interior wall of the pipeline.

33. The sealing device of claim 24, further comprising a sealant configured to seal the leak.

34. A sealing device for sealing a leak within a pipeline for transporting fluid, the sealing device comprising:
a closed flexible wall formed into a substantially tubular shape defining an opening; and
an internal frame coupled to the closed flexible wall and configured to control a movement of the closed flexible wall by applying a force to the closed flexible wall;
wherein the movement of the closed flexible wall moves the sealing device through the pipeline;
wherein the closed flexible wall includes external structures positioned on an outer surface of the closed flexible wall and configured to control a speed of the sealing device as the sealing device moves through the pipeline; and
wherein the sealing device may be deployed in order to seal the leak.

35. A sealing device for sealing a leak within a pipeline for transporting fluid, the sealing device comprising:

a closed flexible wall formed into a substantially tubular shape defining an opening, wherein the closed flexible wall includes a pipeline-facing surface and a fluid-facing surface; and an internal frame coupled to the closed flexible wall and configured to control a movement of the closed flexible wall by applying a force to the closed flexible wall;

wherein the movement of the closed flexible wall moves the sealing device through the pipeline;

wherein the pipeline-facing surface and the fluid-facing surface of the closed flexible wall are configured to repetitively change places with one another as the sealing device moves along the pipeline; and wherein the sealing device may be deployed in order to seal the leak.

36. A sealing device for sealing a leak within a pipeline for transporting fluid, the sealing device comprising:

a closed flexible wall formed into a substantially tubular shape defining an opening;

an internal frame coupled to the closed flexible wall and configured to control a movement of the closed flexible wall by applying a force to the closed flexible wall; and an adhesive configured to adhere the sealing device to an interior wall of the pipeline;

wherein the movement of the closed flexible wall moves the sealing device through the pipeline; and wherein the sealing device may be deployed in order to seal the leak.

* * * * *